United States Patent [19]

Stockton

[11] Patent Number: 4,527,425
[45] Date of Patent: Jul. 9, 1985

[54] SYSTEM FOR DETECTING BLOW OUT AND LOST CIRCULATION IN A BOREHOLE

[75] Inventor: James G. Stockton, Houston, Tex.
[73] Assignee: NL Industries, Inc., New York, N.Y.
[21] Appl. No.: 448,531
[22] Filed: Dec. 10, 1982
[51] Int. Cl.³ .................... E21B 47/10; G01F 1/66
[52] U.S. Cl. ................... 73/155; 73/861.29; 175/48
[58] Field of Search ............... 73/155, 861.28, 861.29; 175/48

[56] References Cited

U.S. PATENT DOCUMENTS

| | | | |
|---|---|---|---|
| 3,602,322 | 8/1971 | Gorsuch | 73/155 |
| 3,678,731 | 7/1972 | Wells et al. | 73/861.29 |
| 3,740,739 | 6/1973 | Griffin, III et al. | 175/48 |
| 3,760,891 | 9/1973 | Gadbois | 73/155 |
| 3,901,078 | 8/1975 | McShane | 73/861.29 |
| 3,910,110 | 10/1975 | Jeffries et al. | 73/155 |
| 4,208,906 | 6/1980 | Owings | 73/155 |

Primary Examiner—Howard A. Birmiel
Attorney, Agent, or Firm—Carl O. McClenny; William E. Johnson, Jr.

[57] ABSTRACT

A drilling mud flow rate detector, including a sub adapted for being positioned in the drill string, having a sonic signal generator located near the center of the sub in both the incoming mud flow path and the return mud flow path. A set of sonic signal receivers is located at both ends of the sub in both the mud input flow path and the mud return flow path and corresponding sets of sonic signal transmitters are located near the center of the sub. The distance between the transmitting transducers at the center of the sub and the receiving transducers located at each end of the sub are equal so that under a condition of no mud flow, the sonic signals arrive at each end of the sub simultaneously. During mud flow, "doppler effect" will produce phase shifts in the sonic signals which are proportional to the direction and the rate of mud flow. Signals received by the receiving transducers are processed to produce an input mud flow rate signal and an output mud flow rate signal which are then compared. The occurrence of a change in the ratio of mud input flow to mud output flow above a preselected value will trigger an alarm indicative of the commencement of either a rapid influx of fluids from the formation into the mud stream, known as a "blow-out", or a rapid outflow of mud into the formation, known as "lost circulation".

23 Claims, 12 Drawing Figures

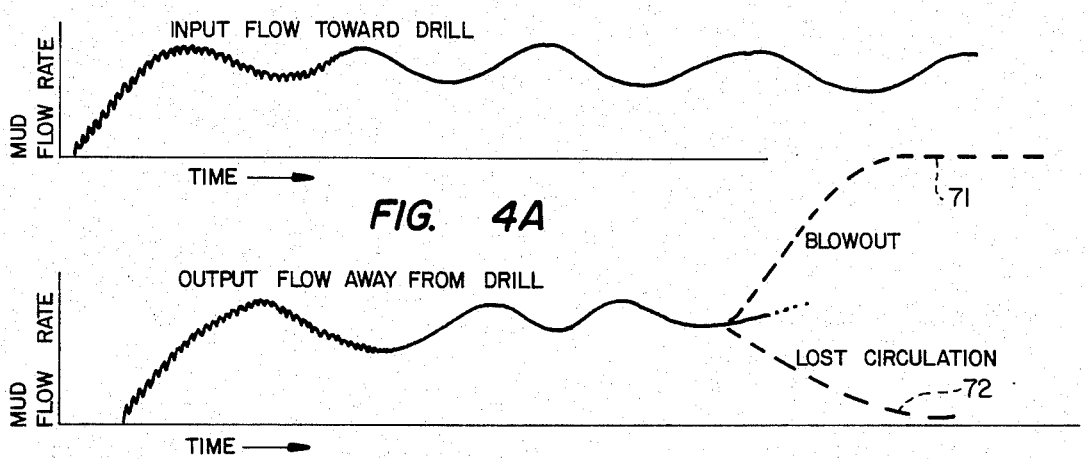
FIG. 4A
FIG. 4B
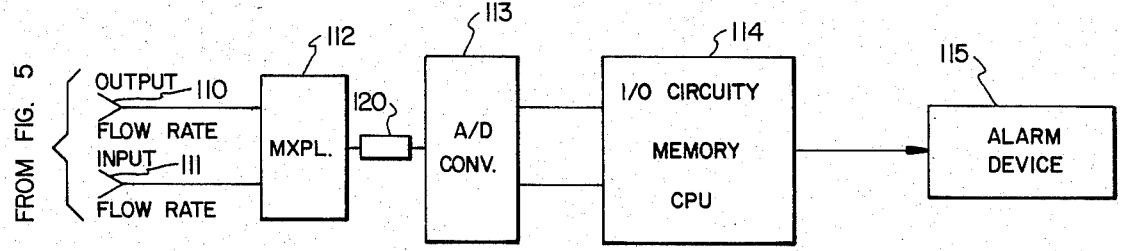
FIG. 6
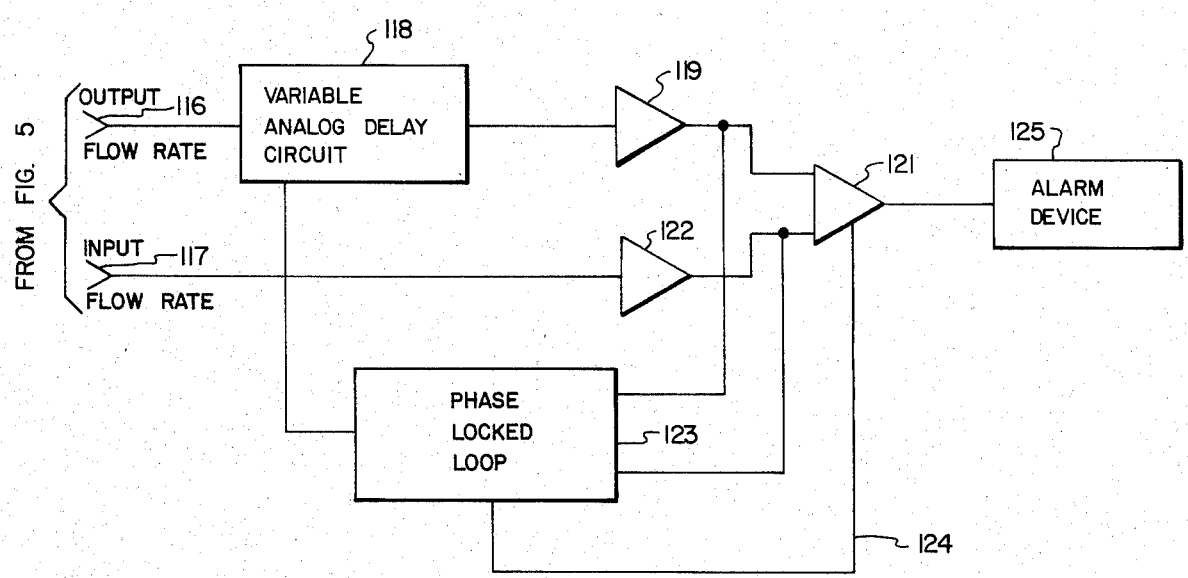
FIG. 7

SYSTEM FOR DETECTING BLOW OUT AND LOST CIRCULATION IN A BOREHOLE

BACKGROUND OF THE INVENTION

1. Field of the Invention

The invention relates to a system for the early detection of a change in drilling mud flow rates in an operational drilling rig and, more particularly, the rapid detection of an impendent "blow-out" condition or an impendent "lost circulation" condition during operation of borehole drilling equipment.

2. History of the Prior Art

In the drilling of an oil and gas well, a common, ever present danger is that of drilling into an earth formation which contains high pressure fluids. When this occurs, the high pressure fluids from the formation enter the borehole and displace the drilling mud back up the borehole toward the drilling rig at the surface. If the intrusion of high pressure fluids back into the borehole is not detected quickly and controlled, it can result in the complete displacement of the drilling mud back up the borehole and expulsion of the high pressure fluids out the top of the borehole. This event is called a "blow out" and can result in great injury to both property and life due to the high combustability of the natural gas and other fluids and the violence with which they exit from the borehole.

On the other hand, it is possible that, during drilling, a borehole may enter a formation which is highly porous and create a tendency for all of the drilling mud to flow freely from the borehole into the porous formation. This event is termed "lost circulation" and can result in the substantial loss of drilling fluids if the lost circulation is not detected very rapidly and preventive measures taken. Upon the impendence of either of these two events, "blow-out" or "loss circulation", it is desirable to detect them as rapidly as possible in order to take remedial action to control the run-away mud flow and prevent either its substantial loss into a porous formation or to prevent its moving back up the borehole toward the surface and thereby prevent the possibility of personal injury and damage to equipment resulting from that rapid upward movement.

It is known to compare the input mud flow with the return mud flow in a borehole. A substantial increase in the rate of return mud flow with no corresponding increase in input flow is indicative of a "blow-out" whereas a substantial increase in input flow without a corresponding increase in the output flow of mud is indicative of lost circulation. The biggest prior art difficulty with measuring these changes in mud flow rates has been that it has only been possible to make such measurements near the surface end of the borehole. Therefore in a deep borehole it was only possible to detect the imminence of "blow-out" at a location which is quite remote from the location down in the borehole where the event actually occurred. Thus, substantial amounts of time may have elapsed prior to the detection of the occurrence of this event at the surface and substantial damage may have also occurred before remedial action can be taken.

One additional difficulty associated with the surface measurement and detection of sudden changes in mud flow rates is that offshore wells are often drilled by either a drilling ship or a floating platform. Therefore, compensation must be made in the drill string for the movement of the drilling support structure floating on the surface of the sea. With the waves and tides associated with such offshore drilling operations, it is necessary to provide telescoping sections in both the drill string itself as well as in the riser pipe, which conducts the return mud flow from the top of the borehole in the sea floor back to the vessel. As the riser pipe telescopes in and out with wave action, the volume of mud contained within the riser pipe section varies in accordance with the telescoping movements. Thus, if mud flow measurements are made on the drilling vessel at the surface, this periodic and cyclic variation in the mud flow must be compensated for when attempting to measure a rate of change of mud flow which might be occurring due to "blow out" or "lost circulation" conditions occurring down hole. Most prior art techniques have measured mud flow rates at the surface and have, therefore, concerned themselves principally with compensating for variations in mud flow due to the telescoping action of the riser pipe.

Techniques for monitoring an impending blow out by down hole measurement have generally relied upon the detection of gas influx into the return mud flow path in the annular region between the drill pipe and the walls of the hole. The measurements of such a parameter in the return mud flow is only indicative of gas kick and is virtually ineffective to alert the drilling crew to a lost circulation condition.

The system of the present invention overcomes many of the disadvantages of the prior art by making the measurement of mud flow rates down hole near the drilling bit where an actual change of relative mud flow rates first occurs under either a gas kick or lost circulation condition. Also, the system of the present invention avoids the necessity of making substantial and complicated calculations to compensate for riser pipe volume variations as would be necessary when the measurement is made near the surface where the mud flow enters and leaves the riser pipe.

The system of the present invention functions very effeciently to rapidly measure the rate of change of input mud flow and output mud flow near the bottom of the borehole and detect any substantial variation in those flow rates to interpret those variations and produce an alarm signal upon the occurrence of either a blow-out or lost circulation condition.

SUMMARY OF THE INVENTION

The invention includes a method and a system for detecting the commencement of blow outs and lost circulation in a borehole in which a drilling fluid is being circulated by transducing, at a selected location within the borehole, the rate of flow of the drilling fluid into the borehole into a first electrical signal proportional to the input flow rate and then accumulating the first electrical signals over a selected interval of time. The method and system also includes transducing, at the selected location within the borehole, the rate of flow of the drilling fluid out of the borehole into a second electrical signal proportional to the output flow rate and then accumulating the second electrical signals over a selected interval of time. The accumulation of first electrical signals and the accumulation of second electrical signals are compared to determine the differences in value. A preselected difference between the compared values is indicative of the commencement of one of a blow out and lost circulation.

Another aspect of the method and system for detecting the commencement of blow outs and lost circulation in a borehole of the invention include generating at a selected point within the borehole a sonic signal within the flowing streams of drilling fluid. The sonic signals are received at a first point located a selected distance above the selected point and at a second point located the same selected distance below the selected point. The time difference between reception of the sonic signal at the first and second points in the incoming fluid stream is measured and the first electrical signal is produced in proportion thereto, while the time difference between reception of the sonic signal at the first and second points in the outgoing fluid stream is measured and the second electrical signal is produced in proportion thereto.

In a further aspect the method and system of detecting the commencement of blow outs and lost circulation in a borehole according to the invention includes generating at a selected location within the borehole a first sonic signal within the stream of drilling fluid flow into the borehole, receiving the first sonic signal at a first point located a selected distance downstream of said selected location and receiving the first sonic signal at a second point located the same selected distance upstream of the selected location. A first time difference is measured between reception of the first sonic signal at the first point and at the second point and the first electrical signal is produced proportional to the first time difference.

Additionally, the invention includes generating at the selected location within the borehole a second sonic signal within the stream of drilling fluid flow out of the borehole, receiving the second sonic signal at a first point located a selected distance downstream of the selected location and receiving the second sonic signal at a second point located the selected distance upstream of the selected location. A second time difference is measured between reception of the second sonic signal at the first point and the second point and a second electrical signal is produced proportional to the second time difference.

BRIEF DESCRIPTION OF THE DRAWING

For a more complete understanding of the present invention and for further objects and advantages thereof, reference may now be had to the following description taken in conjunction with the accompanying drawings, in which:

FIG. 4A and 4B are, respectively, graphs of typical input mud flow rates and output mud flow rates of a drilling rig illustrating the variations and the similarities between the two characteristic patterns;

FIG. 6 is a block diagram of one embodiment of a mud flow rate variation analysis system, used in the present invention;

FIG. 7 is a second embodiment of a mud flow rate variation analysis system used in the present invention;

DETAILED DESCRIPTION

Figure 1:
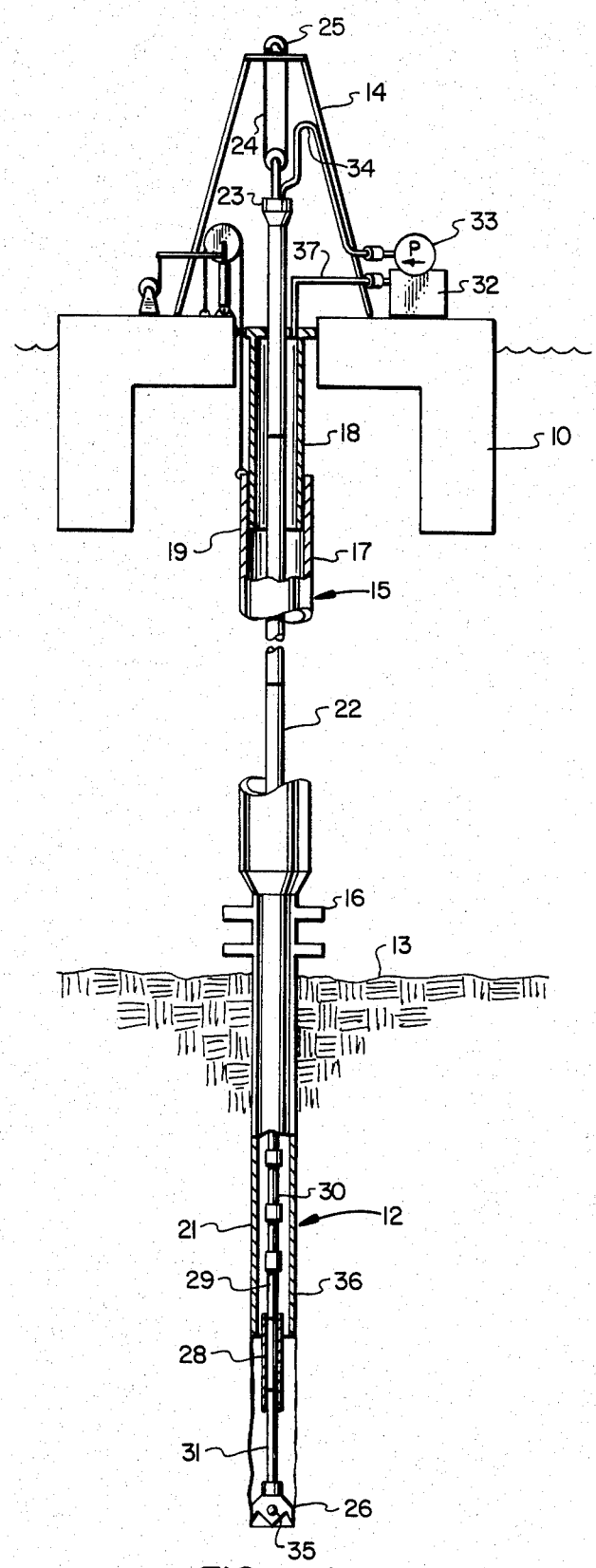
FIG. 1 is a partially cut-away side illustration of an offshore drilling rig incorporating the system of the invention.

FIG. 1 schematically illustrates selected portions of an offshore well drilling apparatus comprising a semi-submersible drilling vessel 10 floating upon a body of water 11 and which is engaged in drilling a sub-aqueous well 12 in the sea bed 13. The vessel 10 has mounted upon its upper surface a derrick 14 which includes a draw works (not shown) and the other apparatus necessary to drill offshore boreholes. Extending between the vessel 10 and the well 12, there is a marine riser indicated generally by 15 which includes at its lower end a conventional blow-out preventer 16 and at its upper end a telescoping joint 17. The telescoping joint 17 includes an upper cylindrical portion 18 and a lower cylindrical portion 19. The lower portion 19 remains stationary with respect to the sea bed 13 while the upper cylindrical portion 18 moves vertically with the generally periodic movement of the vessel 10 upon the surface of the sea 11. The upper cylindrical portion 18 and the lower cylindrical portion 19 are slidably sealed with respect to one another to allow relative axial movement therebetween. A drill casing 21 extends from the blow-out preventer 16 to a preselected distance into the sea bed 13. A drill string 22 is supported from a swivel 23 within the frameworks of the derrick 14. The swivel 23 is connected by means of cables 24 to the crown block 25 positioned at the top of the derrick 14 while the drill string 22 extends downwardly from the swivel 23 through the marine riser 15, the blow-out preventer 16, the well casing 21 into the borehole 12. A rotary drilling bit 26 is secured to the lower end of the drill string 22 and is rotated by various means to drill the borehole into the earth. The drill string 22 also includes a telescoping joint which includes an outer cylindrical portion 28 which surrounds and is sealed against an upper inner cylindrical portion 29 and is fixed to a lower portion 31 of the drill string. Upper and lower portions 29 and 28 of the drill string 22 are slidably sealed to allow relative axial movement whereby the inner portion 29 telescopes into the outer portion 28. The telescoping joint allows the lower outer portion 28 to remain stationary with respect to the sea bed 13 while the upper, inner portion 29 moves vertically with the generally periodic movement of the vessel 10 upon the surface of the sea 11. Thus, the drilling operation is isolated from effects due to vertical movement of the vessel. The system of the invention is mounted within a sub 30 preferably placed in the drill string near the drill bit 26.

Drilling fluids are employed during the drilling of a borehole for cooling the drilling bit and flushing out dirt and rock chips separated from the formation during the drilling operation. Drilling fluid is circulated during drilling by pumping it from a mud tank 32 with a pump 33 through a stand pipe 34 into the swivel 23. The drilling mud is circulated into the borehole down the axial inner bore of the drill string 22 and out into the borehole through ports 35 in the drill bit 26. The drilling mud returns to the drilling vessel 10 through the annular space 36 between the outer surface of the drill string 22 and the inner wall of the borehole, the inner wall of the casing 21 and the inner wall of the marine riser 15. Once back upon the vessel 10, the drilling fluid is returned to the mud tank 32 through the conduit 37 and conventional solids separation equipment (not shown).

Figure 2:
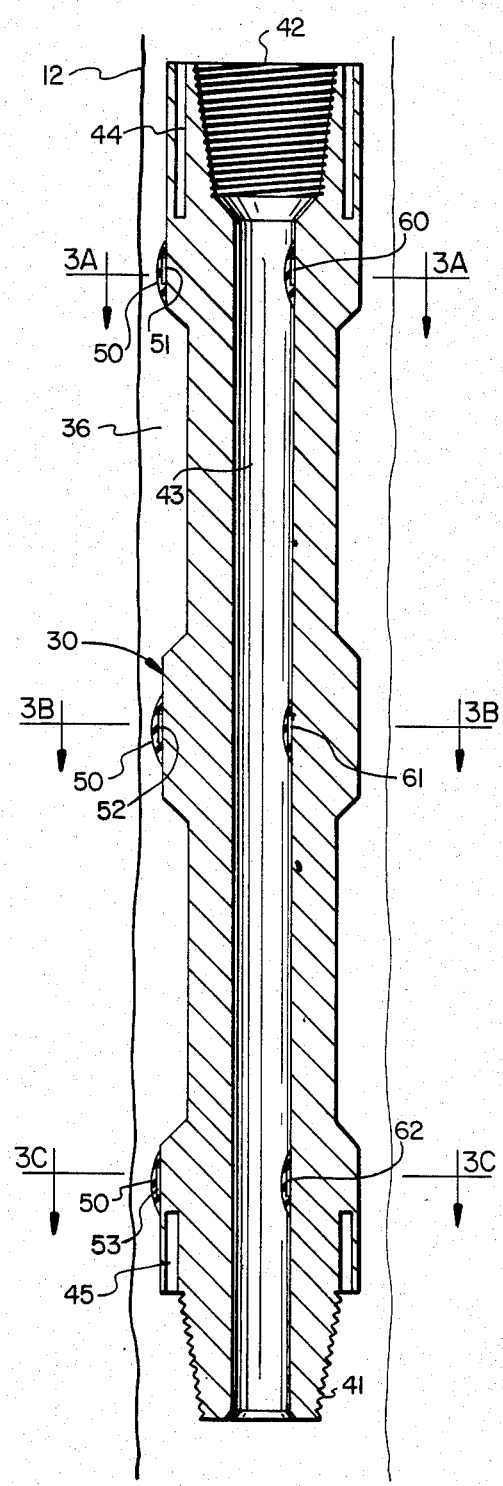
FIG. 2 is a longitudinal cross-section of a sub incorporating the system of the present invention.
Figure 3A:
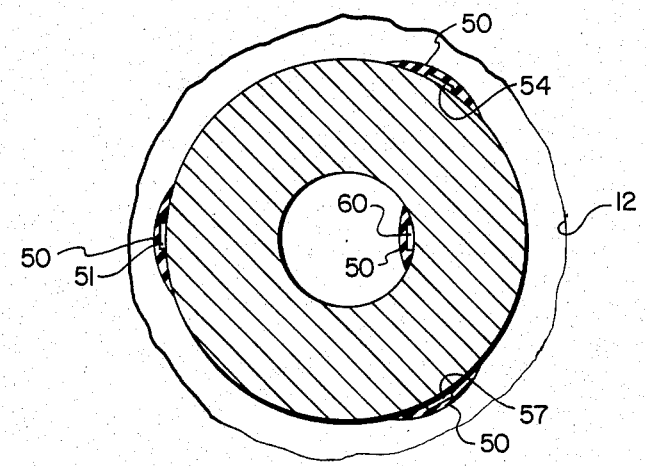
FIGS. 3A, 3B and 3C are transverse cross sections of the sub of FIG. 2 taken about lines 3A—3A, 3B—3B and 3C—3C, respectively of FIG. 2.
Figure 3B:
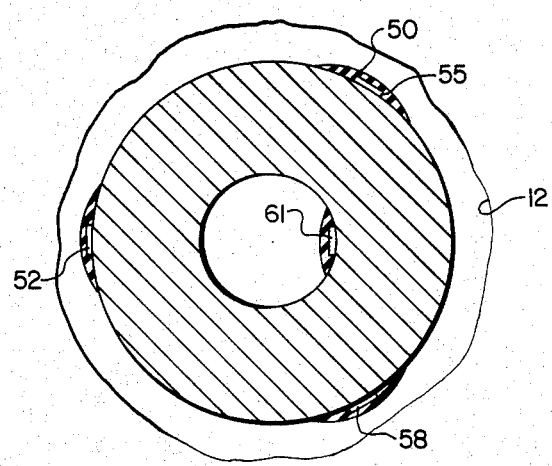
Figure 3C:
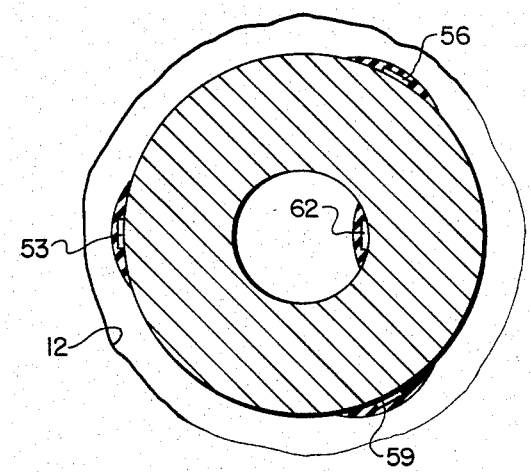

Referring now to FIGS. 2 and 3, there are shown longitudinal and transverse cross-sectional sectional views, respectively, of the sub 30 positioned within the system of the present invention. The sub 30 is generally cylindrical and includes a pin end 41 and a box end 42 for mounting of the sub coaxially within a string of drill pipes. A cylindrical axial passage 43 extends through the sub 30 to allow passage of incoming drilling fluid from the surface down the drill string 22 toward the drill bit 26. The outgoing drilling mud flow returns back up the borehole along the outside wall of the sub 30 which forms the inner surface of the annular space 36. The sub 30 has a number of cavities formed therein for receiving various electronic components forming portions of the present invention which are located down hole. For example, a pair of annular cavities 44 and 45 are located at the box and pin ends, respectively, of the sub 30. As shown in FIGS. 2 and 3A, the upper end of the sub 30 includes three circumferentially spaced outer receiving sonic detectors 51, 54 and 57 which are located recessed just below the exterior of the surface of the sub 30 and protected by a sound transmisive cover 50. It should be understood that the illustration of sonic transducers 51-62 and covers 50 in the drawing are merely schematic and various physical configurations of conventional sonic transducers and mounting arrangements may be used. Each of detectors 51, 54 and 57 are preferably spaced around the cylindrical outer surface of the sub at 120 degrees from one another to enable the averaging of three separate flow rate signals detected thereby to compensate for flow rate variations due to variations in the shape of the annular region 36 adjacent the sub 30. For example, the spacing of the outer surface of the sub 30 from the inner walls at the hole 12 may vary during slant hole drilling and the like. The center section of the sub 30, shown in FIGS. 2 and 3B include three circumferentially spaced transmitting sonic transducers 52, 55 and 58, located near the outer surface of the sub 30. Similarly, FIGS. 2 and 3C shows the lower end of the sub 30 and a set of three receiving sonic detectors 53, 56 and 59 equally spaced around the periphery thereof. The upper, center and lower transducers 51, 52 and 53 are in axial aligment with one another as are transducers 54, 55 and 56 and 57, 58 and 59, respectively.

A single receiving sonic detector 60 is located just below the surface of inner passage 43 at the upper end of the sub 30, a single transmitting sonic transducer 61 is located near the middle of the sub 30 and a lower receiving sonic detector 62 is located near the lower end of the sub. Due to the cylindrical shape of the axial passage 43, the consistency of the cross-sectional profile of the mud flow rate produces sufficiently accurate data to measure the incoming flow rate of the mud down the central passage 43 of the drill pipe at only one cross-sectional location. The sonic transducers shown in FIG. 3A and 3B are all operated in a receiving mode and producing an electrical output in response to that signal. The set of sonic transducers shown in FIG. 3B are all operated in the transmitting mode wherein signals are generated and transmitted toward both ends of the sub in response to an excitation signal imposed upon those transducers. The inner sonic transmitter 61 lies on a common cross-sectional plane with the outer sonic transmitters 52, 55 and 58. Inner and outer sonic receivers 60 and 51, 54 and 57 lie on a common cross-sectional plane at the upper end of sub 30 while inner and outer sonic receivers 62 and 53, 56 and 59 lie on a common cross-sectional plane at the lower end. Sonic receivers 60, 51, 54 and 57 are spaced the same distance from the sonic transmitters 61, 52, 55 and 58 as sonic receivers 62, 53, 56 and 59 are spaced from the transmitters.

Referring now to FIGS. 4A and 4B there are shown there two graphs of mud flow rates as functions of time for an offshore well. The graph shown in FIG. 4A is typically illustrative of input mud flow rates, i.e. the rates of drilling fluid flow toward the drill as a function of time. The smaller amplitude, higher frequency oscillations of the flow rates are produced by pump strokes and drill noise and the larger amplitude, lower frequency sinusoidal fluctuations of the mud flow rates are attributable to the volumeric variations produced by the telescoping riser section within the drilling string which follows the rise and fall of the drilling vessel 10, as described above. Similarly, FIG. 4B shows a typical output mud flow rate pattern, i.e., the rates of drilling fluid flow away from the drill back up-hole toward the mud pump 33. The output mud flow rate also includes smaller amplitude, higher frequency variations due to pump stroking and drill noise and larger amplitude, lower frequency variations due to the rise and fall of the drilling vessel and the necessary telescoping movements of the risers to compensate therefor. As can be seen from the general appearance of graphs 4A and 4B, once a steady state condition is reached in mud flow after first initiating flow, the relative input and output flow curves are basically repetitious of one another shifted slightly in phase to compensate for the delay time between the input flow measurement and the output flow measurement points. Each of these two mud flow rate patterns, both of which are at the surface for the data shown in that graphical illustrations, will be termed "a signature" of the mud flow and each of the two signatures shown generally track one another except for time displacement. As can be seen from FIG. 4B, the output mud flow away from the drill exhibits certain distinctive flow rate characteristics in the event of the occurence of emergency conditions within the borehole. That is, the flow rate represented by the portion of the curve in FIG. 4B designated by the character 71 is characteristically indicative of blow-out while the portion of the curve designated by the character 72 is characteristicly indicative of "lost circulation". One of the objects of the present invention is to monitor the input and output mud flow rate patterns to detect the imminence of either a blow-out or lost circulation as early as possible, i.e., as soon as the characteristic patterns are exhibited in the form of a sudden change in mud flow rate and/or a sudden change in the ratio of input to output mud flow rates.

Figure 5:
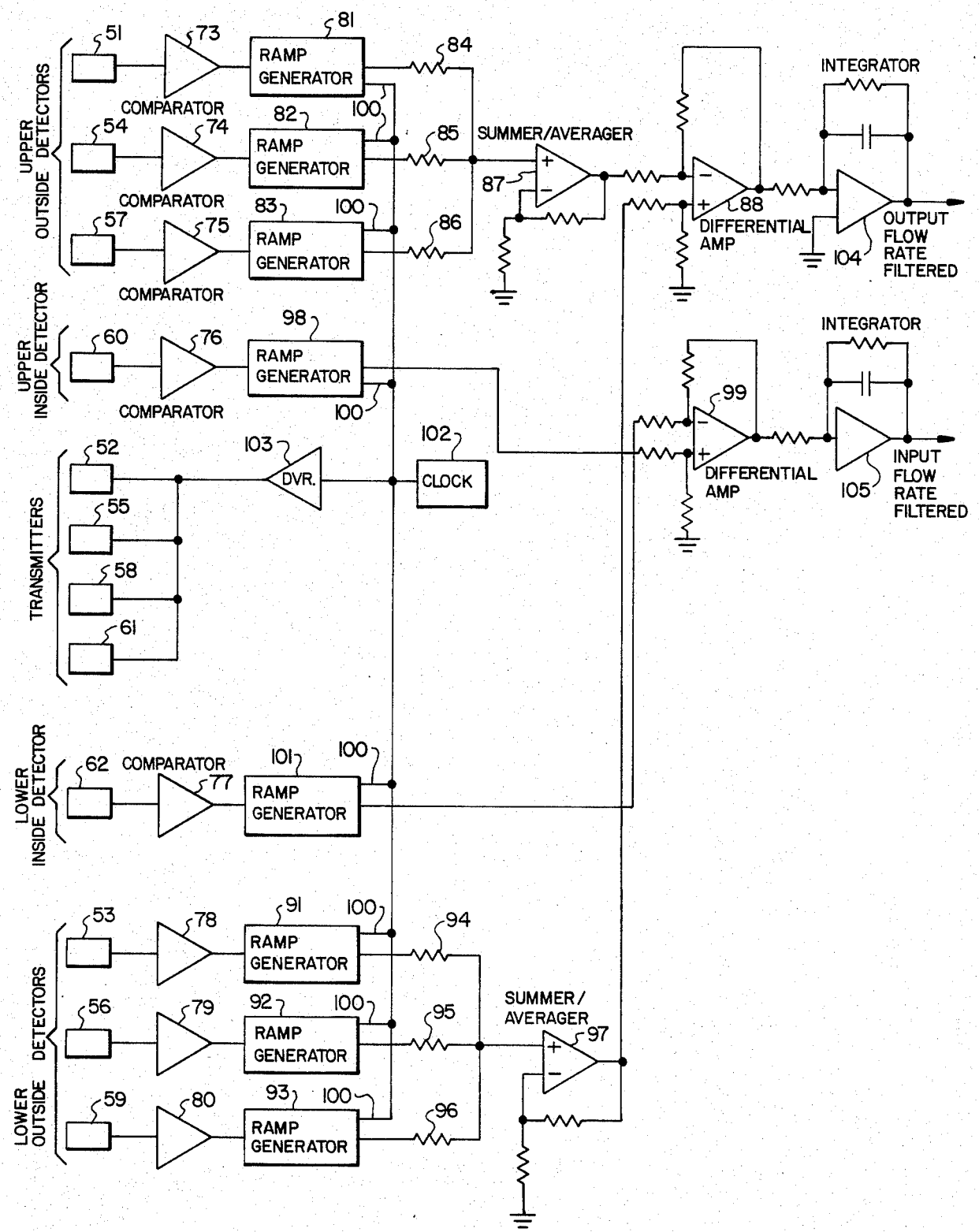
FIG. 5 is a block diagram of a mud flow rate measurement system used in the present invention.

Referring now to FIG. 5, there is shown a block diagram of one embodiment of a flow rate measurement portion of the present invention. As shown, the upper outside set of sonic detectors 51, 54 and 57 are each connected, respectively, to the inputs of comparators 73, 74 and 75, the outputs of which are connected to the inputs of ramp generators 81, 82 and 83 respectively. The outputs of the ramp generators 81, 82 and 83 are each connected together through output resistors 84, 85 and 86, respectively, and together form the input of a summer/averager circuit 87. The output of the summer/averager 87 comprises one input to a differential amplifier 88. The lower outside sonic detectors 53, 56 and 59 are connected, respectively, through comparators 78, 79 and 80 to the respective inputs of ramp generators 91, 92 and 93. The outputs of the three ramp generators 91, 92 and 93 are all connected together through three output resistors 94, 95 and 96 into a summer/averager circuit 97. The output signal from the summer/averager 97 is connected to the other input of the differential amplifier 88. A trigger input 100 of each of the ramp generators 81, 82, 83 and 91, 92 and 93 are all connected in common and to the output of a clock 102.

The upper inside sonic detector 60 is connected through a comparator 76 into a ramp generator 98 the output of which is connected to form one input of a differential amplifier 99. The lower inside detector 62 is connected through a comparator 77 to the input of a ramp generator 101 whose output is connected to form the other input of the differential amplifier 99. The trigger inputs 100 of the ramp generators 98 and 101, are connected to the output of the clock 102. The clock 102 is also connected through a driver circuit 103 to provide a driving signal to the three central outside transmitting transducers 52, 55 and 58 and the one central inside transmitting transducer 61. The output of the differential amplifier 88 is connected through an integrator circuit 104, the output signal from which is indicative of the output flow rate of the mud while the output of the differential amplifier 99 is connected to integrator 105, the output signal of which is indicative of the input mud flow rate.

The operation of the circuitry shown in FIG. 5 comprises operating the clock 102 at an ultrasonic frequency typically on the order 20 KH$_z$ through the driver circuit 103, the output of which drives the three outside, circumferentially spaced transducers 52, 55 and 58 and the inside transducer 61. Each of these four transducers, when in a driven mode, operate to transmit a signal at an ultrasonic frequency on the order of 200 KH$_z$ which oscillations are directed toward the upper and lower ends of the sub 30 to be received by the receiving detectors located there both inside and outside of the sub in the respective input and output mud flow paths. It is known that an oscillating vibration being carried through a moving medium will be affected by a phenomenon known as the "doppler effect". This phenomenon shifts the phase of the propagating signal in the direction of the flow of the flowing medium within which the signal is being transmitted. That is, for example, a 200 KH$_z$ signal being transmitted by the inside central transducer 61 will be received by the lower inside detector 62 at a time slightly ahead of the reception of the same signal by the upper inside detector 60 because of the doppler effect produced by the mud flow along the inner passageway 43 which is in a direction from the upper detector 60 towards the lower detector 61. The flowing mud medium retards any signal being transmitted against the mud flow while accelerating any signal being transmitted in the same direction as the mud flow. Since the return mud flow is in the opposite direction along the outer surface of the sub 30, i.e., from the lower portion of the sub toward the upper portion of the sub, the signals transmitted by the central outer transmitting transducers 52, 55 and 58 will be received at an earlier time period by the upper outer receiving transducers 51, 54 and 57 than it will be received by the lower, outer receiving transducers 53, 56 and 59. The transducers are preferably piezoelectric and of the type typically used in sonar applications, for example, bariumtitinate crystals.

In accordance with the laws governing fluid flow, a given fluid stream flowing through a smaller cross-sectional area will flow faster than the same stream flowing through a larger cross sectional area. Therefore to allow for a non-central positioning of the sub 30 within the borehole and the resultant variations in flow rate along various circumferentially spaced areas adjacent to the outside of the sub, three detectors spaced 120 degrees from each other are used at both the upper and lower ends of the sub. The outputs of each of these three detectors are averaged to obtain a value independent of the variation in spacing between the outer surface of the sub and the inner walls of the hole and the flow rate variations produced thereby.

When the detector 51 receives a 200 KH$_z$ signal of sufficient magnitude, it produces an output which triggers the output of a comparator 73. The comparator 73 is used to filter certain elements of sonic noise which may be associated with the rotation and movement of the drill string within the borehole during the drilng operation to ensure that the only signals to be passed by the comparator are those produced in response to the detection of a transmitted signal. Thus, the outputs of the comparators 73, 74 and 75 are each produced in response to inputs of the detectors 51, 54 and 57.

Ramp generators 81, 82 and 83 each operate to generate a ramp-shape voltage function beginning from zero when the generator is triggered "on". Each of the ramp functions has an identical slope so that the voltage amplitude value in each is the same at a selected time after the generator has been triggered "on", thus, the voltage value is directly related to the time between turning a generator "on" and turning it "off". When a pulse from clock 102 is generated to stimulate driver 103 and produce sonic signals from transducers 52, 55 and 58, that pulse is also coupled through reset and trigger inputs 100 of the ramp generators 81, 82, 83 and 91, 92 and 93 to trigger each of the ramp generators so that all begin generating a ramp function simultaneously. When sonic signals are received by the detectors 51, 54 and 57 outputs are produced by the respective comparators 73, 74 and 75. Output signals from each comparator 73, 74 and 75 trigger ramp generators 81, 82 and 83, respectively, to turn "off" and each will have stored therein a voltage value indicative of the length of time that generator was "on". Output voltages from the ramp generators 81, 82, and 83 are connected through resistors 84, 85 and 86 into the input of the summer/averager 87 which computes the average voltage value from the ramp generators and connects that average value as the negative input of the differential amplifier 88. Similarly, the 200 KH$_z$ signal detected by the lower outside sonic detectors 53, 56 and 57 is used as an input to similar comparators 78, 79 and 80 which also produce output signals in response to a detection of sonic signals. The ramp generators 91, 92 and 93 are each triggered "on" simultaneously with a pulse from the clock 102 which stimulated the production of a sonic transmission from transducers 52, 55 and 58. The outputs of comparators 78, 79 and 80 are connected, respectively, to trigger the ramp generators 91, 92 and 93 "off" and thereby store in each a voltage value indicative of the length of time it remained "on". The three output voltage values are coupled through resistors 94, 95 and 96 to the input of the summer/averager 97 wherein the average value of the voltage generated by the three ramp generators is calculated and connected as the positive input of the differential amplifier 88.

Each of the ramp generators 81, 82 and 83 and 91, 92 and 93 are reset and triggered "on" again by the next pulse from clock 102 so that, effectively, there is repeatedly produced in each ramp generator a signal representative of the length of time required for the sonic signal from the central transmitting transducers to be received first at the upper outside detectors, in the direction of flow of the mud, and at the lower outside detectors, in a direction against the mud flow. The difference between the two times is assessed in the differential amplifier 88. Integrator 104 produces a filtered output mud flow rate signal.

The pulses from clock 102 also stimulate driver 103 and produce a signal having a frequency on the order of 200 KH$_2$ from the transmitting transducer 61 located in the interior of the sub 30. Each clock pulse is coupled through reset and trigger inputs 100 of the two ramp generators 98 and 101 and cause each to simultaneously begin the generation of two identical ramp voltage functions. The sonic signal is received first by the lower inside detector 62 the output of which is filtered by the comparator 77 and input to trigger the ramp generator 101 "off". Next, the upper inside detector 60 receives the sonic signal and passes an output through the comparator 76 to trigger the ramp generator 98 "off". The output of ramp generator 101 is connected as a negative input of a differential amplifier 99 while the output of the ramp generator 98 is connnected as the positive input of the different amplifier 99. The lower inside transducer 62 receives signals first due to the direction of mud flow being the same as the propagating of the sonic signals, therefore comparator 77 inhibits operation of its associated ramp generator 101 and the increase in value of its voltage output before ramp generator 98 is inhibited. The output of ramp generator 101 forms one input of the differential amplifier 99. The upper inside transducer 60 produces a signal value on the other input of the differential amplifier 99 which has a larger amplitude than that associated with the lower transducer 62 because of the longer time before ramp generator 99 is triggered "off". This produces a positive voltage output value from the differential amplifier 99. The differential amplifier output signal is then inverted and integrated to provide an output DC signal which is proportional to the varying output of the differential amplifier 99. The output of integrator 105 is a filtered input flow rate signal.

Thus, there have been produced signals indicative of both the input mud flow rate and the output mud flow rate and all that remains is to calculate a difference signal due to a variation of one of these parameters without a corresponding variation in the other of the parameters after compensation for time delay associated with the different input flow and output flow measurement points. As mentioned above, once steady state mud flow has been achieved during borehole drilling it is a variation between these very similar input and output mud flow rate signatures which is indicative of a gas kick or blow-out in the one case or loss circulation in the other. The present invention contemplates several embodiments of a method and system for monitoring the input and output mud flow rates and producing an alarm signal in the event of a substantial variation from an established norm in those two correlatable signals.

Referring now to FIG. 6, there is shown a block diagram of a circuit for detecting variations between input and output drilling fluid flow rate signatures. An output flow rate signal, for example from FIG. 5, is connected through a first input terminal 110 to an analog multiplexer 112. Similarly, a second input terminal 111 is connected to couple an input flow rate signal into the multiplexer 112. The multiplexer 112 is utilized to enable a relatively sophisticated analysis of flow rate signals which may be more advantageously performed in this embodiment by means of computing facilities located at the surface. Therefore, in that instance it is necessary to transmit raw signal data from the point of collection at the sub back uphole by telemetry means 120 such as a wire line, a mud pulse telemetry system or an acoustical telemetry system such as that shown, for example, in U.S. Pat. No. 4,293,936. The multiplexed signals are connected through an analog-to-digital converter 113, the output of which is connected to a data processing system 114. The system 114 represents input/output circuitry, memory facilities and a central processing unit. Input/ouput circuitry connects the digitized input and output flow rate signals into the memory banks where they are each accumulated for programmed analysis and comparison by the CPU to locate significant variations and trends between the input and the output flow rate patterns. It is to be understood that the measured input and output flow rates need not necessarily be quantitively accurate since only the relative relationship between the two is being used to determine the presence of an alarm condition. In the event there is a significant variation between the input and ouput flow rate signals greater than a preselected value, the central processing unit portion of the data processing system 114 provides an output signal to an alarm device 115 which notifies personnel to take appropriate remedial action in view of an imminent blow-out or lost circulation. Alternatively in other embodiments of the present invention, all flow rate signal processing may be performed down hole and used to activate a down hole alarm system such as that shown in U.S. patent application Ser. No. 255,025 (now abandoned) entitled Borehole Telemetry System filed in the names of J. M. Jackson and V. E. Koval and assigned to the assignee or the present invention.

Referring now to FIG. 7, there is shown a system for comparing the input mud flow rate signal and the output mud flow rate signal with each other and sounding an alarm in the event that there is a substantial variation in the two rates of flow. An output flow rate terminal 116 is connected to the input of a variable analog delay circuit 118 which preferably comprises a series of charge coupled devices which enables one input signal to be phase shifted into synchronism with another input signal. The output of the delay circuit 118 is connected to the input of a first scaling amplifier 119 whose output is connected to one input of a comparator 121. An input flow rate terminal 117 is connected to the input of a second scaling amplifier 122 the output of which is connected to the other input of the comparator 112. The scaling amplifiers 119 and 122 permit the two input signals to be made approximately equal in amplitude when the signals are in phase. The output signals from both scaling amplifiers 119 and 122 are also connected as inputs of a phase locked loop circuit 123, the output of which is connected back to the variable analog delay circuit 118 to control the amount of delay introduced by that component. The phase locked loop 123 controls the clock frequency of the delay circuit 118 to shift two signals into phase and then hold them there. An "in lock" signal is communicated via a line 124 from the phase locked loop 123 to the comparator 121 so that actual comparison of the two signals is made only when the phase locked loop is in a "locked" condition. The "in lock" signal from the phase locked loop 123 to the comparator 121 provides a "start up" feature and inhibits operation of the comparator 121 until both input and output mud flow rates have reached an initial steady state condition.

The input flow rate signals are coupled through the terminal 117 and the scaling amplifier 122 into the input of the comparator 121. The ouput flow rate signals represent points occuring at later real times than the corresponding signals from the input flow rate due to the "time spaced" locations of input and output flow measuring points. Thus, it is necessary to delay and accumulate the output flow rate signals by means of the analog delay circuitry 118 so that the respective input and output signals will be aligned in time with one another for corresponding signals. In this embodiment of the invention, the phase locked loop 123 is the means by which the two signals, input and output, are synchronized with one another. A time delay is introduced into the output flow rate and varied by the phase locked loop 123 so that when the loop 123 detects an alignment of the two signals an "in-lock" signal is produced on line 124 and a comparison of the two signals is made in the comparator 121. In the event the "difference" output signal from the comparator 121 is greater than a preselected threshold value a signaling device 125 is triggered to produce an alarm indicative of either impendent blow-out or lost circulation.

Figure 8:
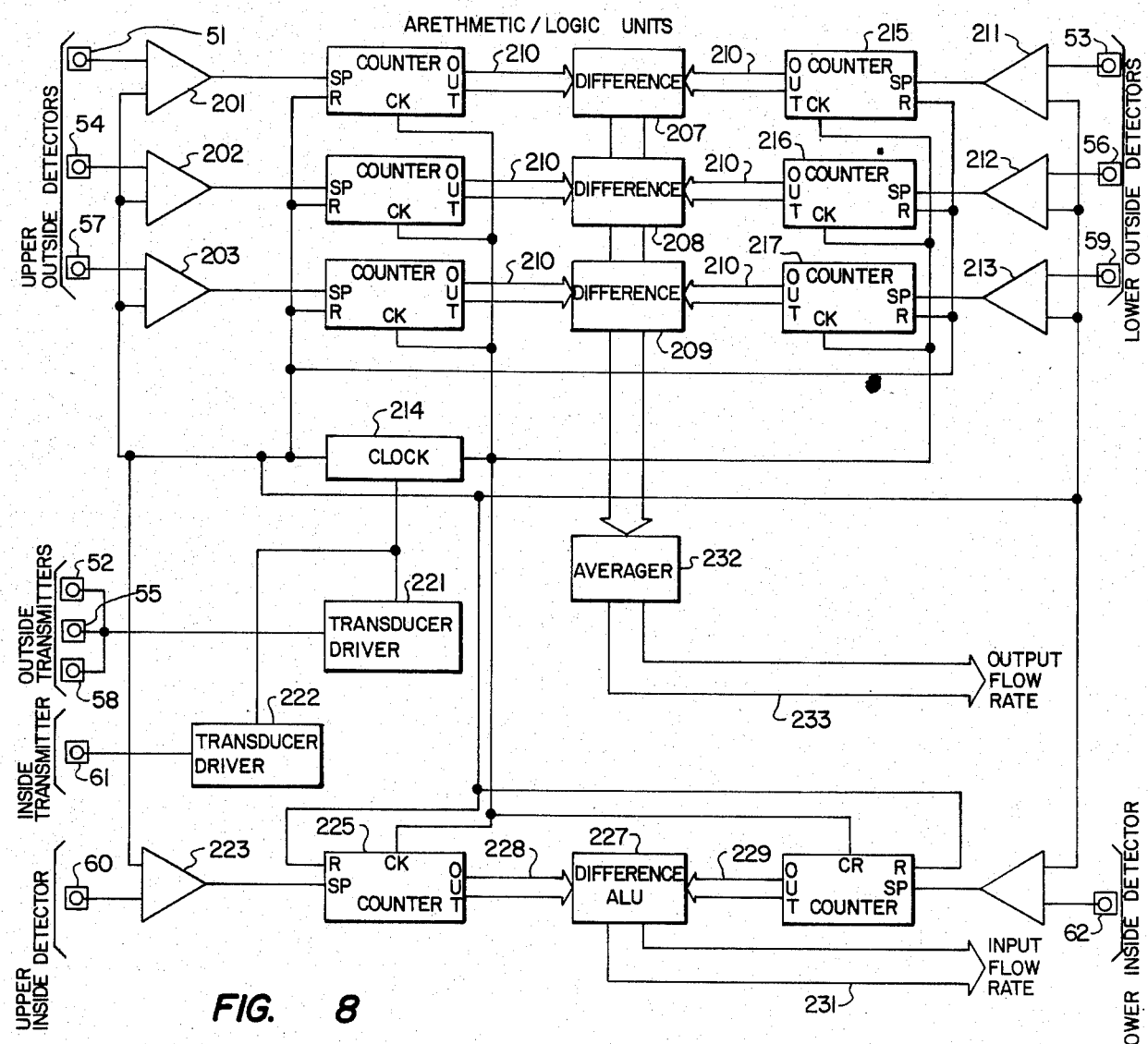
FIG. 8 is a block diagram of an alternate embodiment of a mud flow rate measurement circuit used in the present invention.

Referring now to FIG. 8, there is shown an alternate embodiment of the system of the invention which employs a digital format. The upper outside detectors 51, 54 and 57 are each connected to comparators 201, 202 and 203, respectively. The functions of the comparators, 201-203, as in the embodiment of FIG. 5, is mainly to filter spurious signals which occur due to noise in the system and only permit an output signal from the comparator in response to receipt of a signal from one of the detectors. The output of the comparators 201, 202 and 203 are connected, respectively, to the stop leads of three digital counters 204, 205 and 206. The output of each of the counters 204, 205, and 206 are connected, respectively, to arithmetic/logic units (ALU) 207, 208 and 209 by means of data busses 210. The lower outside detectors 53, 56 and 57 are similarly connected through comparators 211, 212 and 213 to the stop leads of digital counters 215, 216 and 217 the outputs of which are connected by data busses 210 to the other inputs of the ALU's 207, 208 and 209. A clock 214 has an enable lead connected to each of the inputs of the comparators 201, 202 and 203, and 211, 212 and 213, to strobe all of the comparators in synchronism with the clock signal 214. The output of the clock 214 is also connected to the reset leads and clock leads of each of the counters 204, 205, 206, 215, 216 and 217. An arrow 210 has been used to indicate that each of the data busses, such as 210, include multiple lines capable of transmitting digital data in parallel format from one component of the system to another.

The clock 214 is also connected to a first transducer driver 221 which drives the three outside sonic transmitters 52, 55 and 58 and a second transducer driver 222 which is connected to drive the inside transmitter 61. The output of the upper inside sonic detector 60 is connected through a comparator 223, similar to the other comparators shown herein, while the lower inside detector 62 is connected through a comparator 224. The output of the comparator 223 is connected to the input of a counter 225 while the output of the comparator 224 is connected to a counter 226. The output of each of the counters 225 and 226 are connected, via data busses 228 and 229, respectively, to a difference calculating ALU 227. The output of the difference ALU 227, is coupled via a data bus 231 as the input flow rate signal. The outputs of the difference ALU'S 207, 208 and 209 are connected to an averager 232, the output of which is coupled to a data bus 233 as the output flow rate signal.

In operation, the clock 214 drives both the inside and outside transducer drivers 221 and 222 to produce sonic signals by means of the inside transmitter 61 and the outside transmitters 52, 55 and 58. The output of the clock 214 also resets each of the counters and provides a clock signal to start each of the counters accumulating clock pulses. When a transmitted sonic signal is received at the upper outside detectors 51, 54 and 57, each of the counters 204, 205 and 206 are respectively triggered, via the "SP" (stop) lead to stop counting. Similarly, the lower outside detectors 53, 56 and 59 also receive transmitted sonic signals and produce output signals through their respective comparators to the "SP" leads of the respective counters 215, 216 and 217. Thus, the counters are reset and triggered to start counting when a sonic signal is transmitted and then triggered to stop counting when the signal is received by the respective receivers and thereby measure the time required for that sonic signal to pass from the transmitter to the respective receivers. The difference between the time required to receive the signals at the upper outside detectors and the lower outside detectors is measured by comparing the respective data from the counters 204-206 and the counters 215-217 in each of the respective ALU'S 207-209. ALU 207 measures the difference between the digital value stored in counter 204 and counter 215; ALU 208 measures the difference between the values in counters 205 and 216; and, finally, the ALU 209 measures the difference between the counts in counters 206 and 213. The difference values from all three ALU'S 207, 208 and 209 are connected to an averager 232 which averages those three values and then produces a digital value signal over bus 233 as an output flow rate signal.

Simultaneously with triggering the outside transducer systems, the clock 214 resets and starts counters 225 and 226 and also activates the transducer driver 222 to stimulate the inside transmitter unit 61 and produce a sonic signal which is received by both the upper inside detector 60 and the lower inside detector 62. Upon reception of a sonic signal by the upper inside detector 60, a signal is produced through the comparator 223 which is impressed upon the "SP" lead of counter 225 and a count is contained therein indicative of the time required for the sonic signal to pass from the transmitter to the detector. Similarly, the reception of a signal at the lower inside detector 62 produces a signal through comparator 224 to the "SP" lead of the counter 226 and thereby measures the time required for the sonic signal to be projected from the transmitter to the detector. The digital values stored in each of the counters 225 and 226 are connected, via data buses 228 and 229, into a difference ALU 227 which calculates the difference between the two values. The difference signal is then output via data bus 231 which produces an output flow rate signal indicative of the output mud flow rate.

The output flow rate signals and the input flow rate signals produced by the circuitry of FIG. 8 are then processed in the manner disclosed above in connection with the circuitry of FIG. 6. That is, input and output flow rate data are accumulated and compared to determine the variations in data for trend analysis of the respective signatures of the input and output flow rates. In the event that the difference between the input and output flow rate signals is greater than a preselected threshold value, an alarm signal is produced to indicate either a blow-out or a lost circulation condition.

Figure 9:
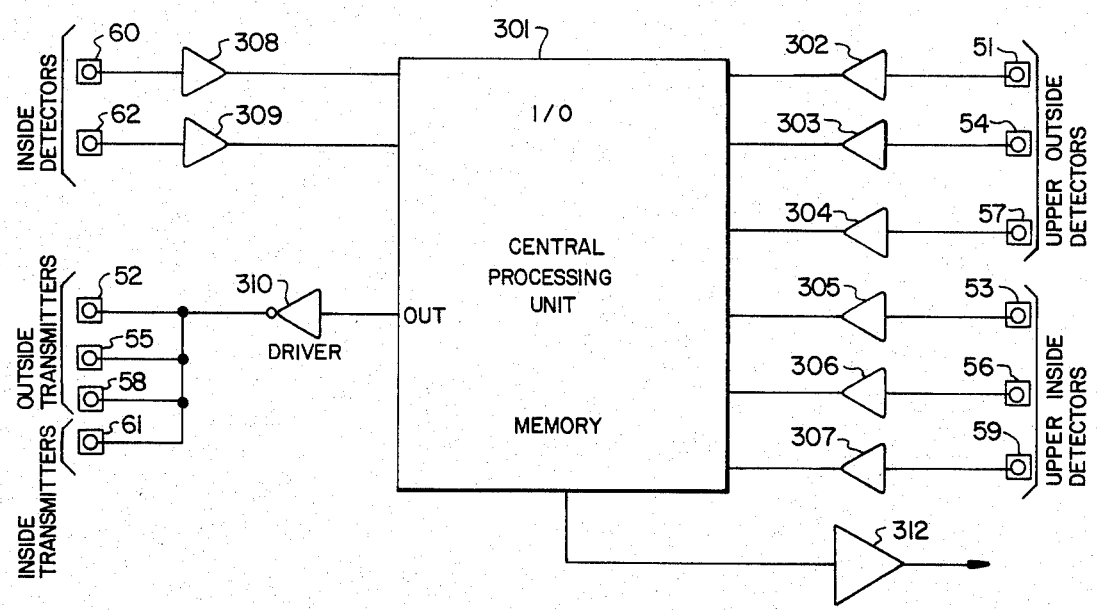
FIG. 9 is a further alternate embodiment of the system of the present invention.

Referring now to FIG. 9 there is shown a block diagram of a further alternate embodiment of a system for practicing the invention. A central data processing system 301 comprises input and output circuitry for receiving signals and for transmitting signals from the central processing unit contained within the system 301. Computing system 301 also includes a central processing unit calculator and a memory. As shown, each of the upper inside detectors 51, 54 and 57 are connected through comparators 302, 303 and 304 as input signals to the computing system 301. Similarly, the upper inside detectors 53, 56 and 59 are connected through comparators 305, 306 and 307 into the system 301. The inside detectors 60 and 61 are connected, respectively, through comparators 308 and 309.

The output of the central computing system 301 is connected through a driver 310 to each of the outside transmitters 52, 55 and 58 and the inside transmitter 61. The computer 301 controls the timing of the transmission of sonic signals by the transmitters and then receives an indication of reception of those sonic signals. The received data which is directly indicative of input and output flow rates is accumulated and stored in a plurality of memory locations from which comparison calculations are made. The computer 301 makes a decision as to the extent of variation between the respective input and output flow rate signatures. In the event a preselected threshold difference between the signatures is surpassed, an alarm signal, via output driver 312, is produced to notify personnel of alarm conditions. As can be seen, the implementation of this emobodiment of this invention would be through the programming of the central computing system 301.

It is believed that the foregoing disclosure and description of the invention are only illustrative and explanatory and various changes in the circuitry and components may be made within the scope of the apended claims without departing from the spirit of the invention.

What is claimed is:

1. A method of detecting the commencement of blowouts and lost circulation in a borehole in which a drilling fluid is being circulated, comprising the steps of:
transducing at a selected location within the borehole the rate of flow of the drilling fluid into the borehole into a first electrical signal proportional thereto;
accumulating said first electrical signals over a selected interval of time;
transducing, at said selected location within the borehole, the rate of flow of the drilling fluid out of the borehole into a second electrical signal proportional thereto;
accumulating said second electrical signals over a selected interval of time;
comparing the accumulation of said first electrical signals with the accumulation of said second electrical signals to determine the differences in value therebetween, a preselected difference between the compared values being indicative of the commencement of one of a blow out and lost circulation, wherein said transducing steps comprise generating at a selected point within the borehole a sonic signal within the flowing streams of drilling fluid;
receiving the sonic signals at a first point located a selected distance above said selected point and at a second point located the same selected distance below said selected point;
measuring the time difference between reception of the sonic signal at said first and second points in the incoming fluid stream and transducing said first electrical signal in proportion thereto and in the outgoing fluid stream and transducing said second electrical signal in proportion thereto, and wherein said measuring step comprises triggering the generation of a ramp function simultaneously with the generation of said first sonic signal;
accumulating the value of said ramp function in response to reception of said first sonic signal at said first point and accumulating the value of said ramp function in response to reception of said first sonic signal at said second point;
comparing the value of said ramp functions after accumulation of each; and
producing a first time difference signal proportional to the difference in the compared values of said accumulated ramp function values.

2. A method of detecting the commencement of blowouts and lost circulation in a borehole in which a drilling fluid is being circulated, comprising the steps of:
transducing at a selected location within the borehole the rate of flow of the drilling fluid into the borehole into a first electrical signal proportional thereto;
accumulating said first electrical signals over a selected interval of time;
transducing, at said selected location within the borehole, the rate of flow of the drilling fluid out of the borehole into a second electrical signal proportional thereto;
accumulating said second electrical signals over a selected interval of time;
comparing the accumulation of said first electrical signals with the accumulation of said second electrical signals to determine the differences in value therebetween, a preselected difference between the compared values being indicative of the commencement of one of a blow out and lost circulation, wherein said transducing steps comprise generating at a selected point within the borehole a sonic signal within the flowing streams of drilling fluid;
receiving the sonic signals at a first point located a selected distance above said selected point and at a second point located the same selected distance below said selected point;
measuring the time difference between reception of the sonic signal at said first and second points in the incoming fluid stream and transducing said first electrical signal in proportion thereto and in the outgoing fluid stream and transducing said second electrical signal in proportion thereto, and wherein said measuring step comprises triggering the generation of a pair of ramp functions having identical slope simultaneously with the generation of said first sonic signal;
interrupting one of said pair of ramp functions in response to reception of said first sonic signal at said first point and interrupting the other of said pair of ramp functions in response to reception of said first sonic signal at said second point;

comparing the value of said one of said ramp functions with said other of said ramp functions after interruption of each; and producing a first time difference signal proportional to the difference in the compared values of said first and second ramp functions.

3. A method of detecting the commencement of blowouts and lost circulation in a borehole in which a drilling fluid is being circulated, comprising the steps of:

transducing at a selected location within the borehole the rate of flow of the drilling fluid into the borehole into a first electrical signal proportional thereto;

accumulating said first electrical signals over a selected interval of time;

transducing, at said selected location within the borehole, the rate of flow of the drilling fluid out of the borehole into a second electrical signal proportional thereto;

accumulating said second electrical signals over a selected interval of time;

comparing the accumulation of said first electrical signals with the accumulation of said second electrical signals to determine the differences in value therebetween, a preselected difference between the compared values being indicative of the commencement of one of a blow out and lost circulation, wherein said first electrical signal transducing step comprises generating at a selected location within the borehole a first sonic signal within the stream of drilling fluid flow into the borehole;

receiving the first sonic signal at a first point located a selected distance downstream of said selected location;

receiving the first sonic signal at a second point located said selected distance upstream of said selected vertical location;

measuring a first time difference between reception of the first sonic signal at said first point and at said second point;

producing said first electrical signal proportional to the first time difference and wherein said second electrical signal transducing step comprises generating at said selected location within the borehole a plurality of sonic signals within the stream of drilling fluid flowing out of the borehole, each of said plurality of second sonic signals being generated at points equally circumferentially spaced from one another within the annular region through which drilling fluid flows toward the surface;

receiving each of said plurality of second sonic signals at a first location spaced a selected distance downstream of said selected location, each of said plurality of sonic signals being received at points equally circumferentially spaced from one another within said annular region and in axial alignment with the respective points of generation;

receiving each of said plurality of second sonic signals at a second location spaced said selected distance upstream of said location, each of said plurality of sonic signals being received at points equally circumferentially spaced from one another within said annular region and in axial alignment with the respective points of generation;

measuring second time differences between reception of each of said plurality of second sonic signals at said first and second locations;

averaging said time differences; and producing said second electrical signal proportional to the average time difference.

4. The method of claim 3 wherein said second time difference measuring step comprises:

triggering the operation of a ramp function simultaneously with the generation of said plurality of sonic signals;

accumulating a plurality of values of said ramp function in response to reception of the associated one of each of said plurality of second sonic signals at said first location, each of said values of said ramp function being associated with one of said plurality of circumferentially spaced second sonic signal generation points;

accumulating a plurality of values of said ramp function in response to reception of the associated one of each of said plurality of second sonic signals at said second location, each of said values of said ramp function being associated with one of said plurality of circumferentially spaced second sonic signal generation points;

averaging the accumulated values associated with reception of sonic signals at said first location;

averaging the accumulated values associated with reception of sonic signals at said second location;

comparing the averaged value associated with sonic signal reception at the first location with the averaged value associated with sonic signal second reception at the second location; and producing a second time difference signal proportional to the difference in said compared averaged values.

5. The method of claim 3 wherein said second time difference measuring step comprises:

triggering the operation of a plurality of pairs of ramp functions simultaneously with the generation of said plurality of sonic signal, each of said pairs of ramp functions being associated with one of said plurality of circumferentially spaced second sonic signal generation points;

interrupting one of each of said plurality of pairs of ramp functions in response to reception of the associated one of each of said plurality of second sonic signals at said first location;

interrupting the other ones of each of said plurality of pairs of ramp functions in response to reception of the associated one of each of said plurality of second sonic signals at said second location;

averaging the values of each of the ramp functions associated with reception of sonic signals at said first location;

averaging the values of each of the ramp functions associated with reception of sonic signals at said second location;

comparing the averaged value associated with sonic signal reception at the first location with the averaged value associated with sonic second reception at the second location; and producing a second time difference signal proportional to the difference in said compared average values.

6. The method of claim 3 wherein said second time difference measuring step comprises:

triggering the operation of a plurality of digital counters simultaneously with the generation of said plurality of second sonic signals;

accumulating the value of said counters in response to reception of the associated one of each of said plurality of second sonic signals at said first location, each of said values being associated with one of said plurality of circumferentially spaced second sonic signal generation points;

accumulating the value of said counters in response to reception of the associated one of each of said plurality of second sonic signals at said second location, each of said values being associated with one of said plurality of circumferentially spaced second sonic signal generation points;

averaging the accumulated values associated with reception of said sonic signals at said first location;

averaging the accumulated values associated with reception of said sonic signals at said second location;

comparing the averaged accumulated values associated with sonic signal reception at the first location with the averaged accumulated values associated with sonic signal reception at the second location; and producing a second time difference signal proportional to the difference in said compared averaged accumulated values.

7. The method of claim 3 wherein said second time difference measuring step comprises:

triggering the operation of a plurality of pairs of digital counters being driven by a common clock simultaneously with the generation of said plurality of second sonic signals, each of said pairs of counters being associated with one of said plurality of circumferentially spaced second sonic signal generation points;

interrupting one of each of said plurality of pairs of counters in response to reception of the associated one of each of said plurality of second sonic signals at said first location;

interrupting the other one of each of said plurality of pairs of counters in response to reception of the associated one of each of said plurality of second sonic signals at said second location;

averaging the values of the counts contained in each of the counters associated with reception of sonic signals at said first location;

averaging the values of the counts contained in each of the counters associated with reception of sonic signals at said second location;

comparing the averaged counts associated with sonic signal reception at the first location with the averaged count associated with sonic signal reception at the second location; and producing a second time difference signal proportional to the difference in said compared counts.

8. A method of detecting the commencement of blowouts and lost circulation in a borehole in which a drilling fluid is being circulated, comprising the steps of:

transducing at a selected location within the borehole the rate of flow of the drilling fluid into the borehole into a first electrical signal proportional thereto;

accumulating said first electrical signals over a selected interval of time;

transducing, at said selected location within the borehole, the rate of flow of the drilling fluid out of the borehole into a second electrical signal proportional thereto;

accumulating said second electrical signals over a selected interval of time;

comparing the accumulation of said first electrical signals with the accumulation of said second electrical signals to determine the differences in value therebetween, a preselected difference between the compared values being indicative of the commencement of one of a blow out and lost circulation, wherein said first electrical signal transducing step comprises generating at a selected location within the borehole a first sonic signal within the stream of drilling fluid flow into the borehole;

receiving the first sonic signal at a first point located a selected distance downstream of said selected location;

receiving the first sonic signal at a second point located said selected distance upstream of said selected vertical location;

measuring a first time difference between reception of the first sonic signal at said first point and at said second point;

producing said first electrical signal proportional to the first time difference and wherein said second electrical signal transducing step comprises generating at said selected location within the borehole a second sonic signal within the stream of drilling fluid flow out of the borehole;

receiving the second sonic signal at a first point located said selected distance upstream of said selected location;

measuring a second time difference between reception of said second sonic signal at said first point and at said second point;

producing said second electrical signal proportional to the second time difference, and wherein said second difference measuring step comprises triggering the generation of ramp functions simultaneously with the generation of said second sonic signal;

accumulating the value of said ramp function in response to reception of said second sonic signal at said first point and accumulating the value of said ramp function in response to reception of said second sonic signal at said second point;

comparing the values of said second ramp function after accumulation of each; and producing a second time difference signal proportional to the difference in the compared values of said accumulated ramp functions.

9. A method of detecting the commencement of blowouts and lost circulation in a borehole in which a drilling fluid is being circulated, comprising the steps of:

transducing at a selected location within the borehole the rate of flow of the drilling fluid into the borehole into a first electrical signal proportional thereto;

accumulating said first electrical signals over a selected interval of time;

transducing, at said selected location within the borehole, the rate of flow of the drilling fluid out of the borehole into a second electrical signal proportional thereto;

accumulating said second electrical signals over a selected interval of time;

comparing the accumulation of said first electrical signals with the accumulation of said second electrical signals to determine the differences in value therebetween, a preselected difference between the compared values being indicative of the commencement of one of a blow out and lost circulation, wherein said first electrical signal transducing step comprises generating at a selected location within the borehole a first sonic signal within the stream of drilling fluid flow into the borehole;

receiving the first sonic signal at a first point located a selected distance downstream of said selected location;

receiving the first sonic signal at a second point located said selected distance upstream of said selected vertical location;

measuring a first time difference between reception of the first sonic signal at said first point and at said second point;

producing said first electrical signal proportional to the first time difference and wherein said second electrical signal transducing step comprises generating at said selected location within the borehole a second sonic signal within the stream of drilling fluid flow out of the borehole;

receiving the second sonic signal at a first point located said selected distance upstream of said selected location;

measuring a second time difference between reception of said second sonic signal at said first point and at said second point;

producing said second electrical signal proportional to the second time difference, and wherein said second time difference measuring step comprises triggering the generation of a pair of ramp functions having identical slope simultaneously with the generation of said second sonic signal;

interrupting one of said pair of ramp functions in response to reception of said second sonic signal at said first point and interrupting the other of said pair of ramp functions in response to reception of said second sonic signal at said second point;

comparing the value of said first and second ramp functions after interruption of each; and producing a second time difference signal proportional to the difference in the compared values of said first and second ramp functions.

10. A system for detecting the commencement of blowouts and lost circulation in a borehole in which a drilling fluid is being circulated, comprising:

means for transducing at a selected location within the borehole the rate of flow of the drilling fluid into the borehole into a first electrical signal proportional thereto;

means for accumulating said first electrical signal over a selected interval of time;

means for transducing, at said selected location within the borehole, the rate of flow of the drilling fluid out of the borehole into a second electrical signal proportional thereto;

means for accumulating said second electrical signals over a selected interval of time;

means for comparing the accumulation of said first electrical signals with the accumulation of said second electrical signals to determine the differences in value therebetween, a preselected difference between the compared values being indicative of the commencement of one of a blow out and lost circulation, wherein said first electrical signal transducing means comprises means for generating at a selected location within the borehole a first sonic signal within the stream of drilling fluid flow into the borehole;

means for receiving the first sonic signal at a first point located a selected distance downstream of said selected location;

means for receiving the first sonic signal at a second point located said selected distance upstream of said selected location;

means for measuring a first time difference between reception of the first sonic signal at said first point and at said second point;

means for producing said first electrical signal proportional to the first time difference, wherein said first time difference measuring means comprises means for triggering the generation of a ramp function simultaneously with the generation of said first sonic signal;

means for accumulating the value of said ramp function in response to reception of said first sonic signal at said first point;

means for accumulating the value of said ramp function in response to reception of said first sonic signal at said second point;

means for comparing the accumulated values; and means for producing a first time difference signal proportional to the difference in the compared accumulated values.

11. A system for detecting the commencement of blowouts and lost circulation in a borehole in which a drilling fluid is being circulated, comprising:

means for transducing at a selected location within the borehole the rate of flow of the drilling fluid into the borehole into a first electrical signal proportional thereto;

means for accumulating said first electrical signal over a selected interval of time;

means for transducing, at said selected location within the borehole, the rate of flow of the drilling fluid out of the borehole into a second electrical signal proportional thereto;

means for accumulating said second electrical signals over a selected interval of time;

means for comparing the accumulation of said first electrical signals with the accumulation of said second electrical signals to determine the differences in value therebetween, a preselected difference between the compared values being indicative of the commencement of one of a blow out and lost circulation, wherein said first electrical signal transducing means comprises means for generating at a selected location within the borehole a first sonic signal within the stream of drilling fluid flow into the borehole;

means for receiving the first sonic signal at a first point located a selected distance downstream of said selected location;

means for receiving the first sonic signal at a second point located said selected distance upstream of said selected location;

means for measuring a first time difference between reception of the first sonic signal at said first point and at said second point;

means for producing said first electrical signal proportional to the first time difference, and wherein said first time difference measuring means comprises means for triggering the generation of a pair of ramp functions having identical slopes simultaneously with the generation of said first sonic signal;

means for interrupting one of said pair of ramp functions in response to reception of said first sonic signal at said first point;

means for interrupting the other of said pair of ramp functions in response to reception of said first sonic signal at said second point;

means for comparing the value of said one of said other ramp functions after interruption of each; and means for producing a first time difference signal proportional to the difference in the compared values of said first and second ramp functions.

12. A system for detecting the commencement of blowouts and lost circulation in a borehole in which a drilling fluid is being circulated, comprising:

means for transducing at a selected location within the borehole the rate of flow of the drilling fluid into the borehole into a first electrical signal proportional thereto;

means for accumulating said first electrical signal over a selected interval of time;

means for transducing, at said selected location within the borehole, the rate of flow of the drilling fluid out of the borehole into a second electrical signal proportional thereto;

means for accumulating said second electrical signals over a selected interval of time;

means for comparing the accumulation of said first electrical signals with the accumulation of second electrical signals to determine the differences in value therebetween, a preselected difference between the compared values being indicative of the commencement of one of a blow out and lost circulation, wherein said first electrical signal transducing means comprises means for generating at a selected location within the borehole a first sonic signal within the stream of drilling fluid flow into the borehole;

means for receiving the first sonic signal at a first point located a selected distance downstream of said selected location;

means for receiving the first sonic signal at a second point located said selected distance upstream of said selected location;

means for measuring a first time difference between reception of the first sonic signal at said first point and at said second point;

means for producing said first electrical signal proportional to the first time difference, and wherein said second electrical signal transducing means comprises means for generating at said selected location within the borehole a plurality of sonic signals within the stream of drilling fluid flow out of the borehole, each of said plurality of second sonic signals being generated at points equally circumferentially spaced from one another within the annular region through which drilling fluid flows toward the surface;

means for receiving each of said plurality of second sonic signals at a first location spaced at a selected distance downstream of said selected location, each of said plurality of sonic signals being received at points equally circumferentially spaced from one another within said annular region and in axial alignment with the respective points of generation;

means for receiving each of said plurality of second sonic signals at a second location spaced said selected distance upstream of said selected location, each of said plurality of sonic signals being received at points equally circumferentially spaced from one another within said annular region and in axial alignment with the respective points of generation;

means for measuring the time differences between reception of each of said plurality of second sonic signals at said first and second locations;

means for averaging said time differences; and means for producing said second electrical signal proportional to the average time difference.

13. The system of claim 12 wherein said second time difference measuring means comprises:

means for triggering the operation of a ramp function simultaneously with the generation of said plurality of sonic signals;

means for accumulating the value of said ramp function in response to reception of the associated one of each of said plurality of second sonic signals at said first location, each of said plurality of ramp functions being associated with one of said plurality of circumferentially spaced second sonic signal generation points;

means for accumulating the value of said ramp functions in response to reception of the associated one of each of said plurality of second sonic signals at said second location, each of said plurality of ramp functions being associated with one of said plurality of circumferentially spaced second sonic signal generation points;

means for averaging the values of said accumulations associated with reception of sonic signals at said first location;

means for averaging the values of said accumulations associated with reception of sonic signals at said second location;

means for comparing the averaged accumulated values associated with sonic signal reception at the first location with the averaged accumulated value associated with the sonic signal reception at the second location; and means for producing a second time difference signal proportional to the difference in said compared averaged accumulated values.

14. The system of claim 12 wherein said second time difference measuring means comprises:

means for triggering the operation of a plurality of pairs of ramp functions simultaneously with the generation of said plurality of sonic signals, each of said pairs of ramp functions being associated with one of said plurality of circumferentially spaced second sonic signal generation points;

means for interrupting one of each of said plurality of pairs of ramp functions in response to reception of the associated one of each of said plurality of second sonic signals at said first location;

means for interrupting the other ones of each of said plurality of pairs of ramp functions in response to reception of the associated one of each of said plurality of second sonic signals at said second location;

means for averaging the values of each of the ramp functions associated with reception of sonic signals at said first location;

means for averaging the values of each of the ramp functions associated with reception of sonic signals at said second location;

means for comparing the averaged value associated with sonic signal reception at the first location with the averaged value associated with sonic signal reception at the second location; and means for producing a second time difference signal proportional to the difference in said compared averaged values.

15. The System of claim 12 wherein said second time difference measuring means comprises:

means for triggering the operation of a plurality of digital counters simultaneously with the generation of said plurality of second sonic signals;

means for accumulating the value of said counters in response to reception of the associated one of each of said plurality of second sonic signals at said first location, each of said counters being associated with one of said plurality of circumferentially spaced second sonic signal generation points;

means for accumulating the value of said counters in response to reception of the associated one of each of said plurality of second sonic signals at said second location, each of said counters being associated with one of said plurality of circumferentially spaced second sonic signal generation points;

means for averaging the accumulated values associated with reception of sonic signals at said first location;

means for averaging the accumulated values associated with reception of sonic signals at said second location;

means for comparing the averaged accumulated values associated with the sonic signal reception at the first location with the averaged accumulated values associated with sonic signal reception at the second location; and means for producing a second time difference signal proportional to the difference in said compared accumulated values.

16. The system of claim 12 wherein said second time difference measuring means comprises:

means for triggering the operation of a plurality of pairs of digital counters driven by a common clock simultaneously with the generation of said plurality of second sonic signals, each of said pairs of counters being associated with one of said plurality of circumferentially spaced second sonic signal generation points;

means for interrupting one of each of said plurality of pairs of counters in response to reception of the associated one of each of said plurality of second sonic signals at said first location;

means for interrupting the other one of each of said plurality of pairs of counters in response to reception of the associated one of each of said plurality of second sonic signals at said second location;

means for averaging the values of the counts contained in each of the counters associated with reception of sonic signals at said first location;

means for averaging the values of the counts contained in each of the counters associated with reception of sonic signals at said second location;

means for comparing the averaged counts associated with sonic signal reception at the first location with the averaged count associated with sonic signal reception at the second location; and means for producing a second time difference signal proportional to the difference in said compared counts.

17. The system of claim 16 further including means for shifting the phase of said accumulation of second electrical signals until it is in phase with said accumulation of first electrical signals.

18. A system for detecting the commencement of blowouts and lost circulation in a borehole in which a drilling fluid is being circulated, comprising:

means for transducing at a selected location within the borehole the rate of flow of the drilling fluid into the borehole into a first electrical signal proportional thereto;

means for accumulating said first electrical signal over a selected interval of time;

means for transducing, at said selected location within the borehole, the rate of flow of the drilling fluid out of the borehole into a second electrical signal proportional thereto;

means for accumulating said second electrical signals over a selected interval of time;

means for comparing the accumulation of said first electrical signals with the accumulation of said second electrical signals to determine the differences in value therebetween, a preselected difference between the compared values being indicative of the commencement of one of a blow out and lost circulation, wherein said first electrical signal transducing means comprises means for generating at a selected location within the borehole a first sonic signal within the stream of drilling fluid flow into the borehole;

means for receiving the first sonic signal at a first point located a selected distance downstream of said selected location;

means for receiving the first sonic signal at a second point located said selected distance upstream of said selected location;

means for measuring a first time difference between reception of the first sonic signal at said first point and at said second point;

means for producing said first electrical signal proportional to the first time difference, wherein said second electrical signal transducing means comprises means for generating at said selected location within the borehole a second sonic signal within the stream of drilling fluid flow out of the borehole;

means for receiving the second sonic signal at a first point located said selected distance upstream of said selected location;

means for measuring a second time difference between reception of said second sonic signal at said first point and at said second point;

means for producing said second electrical signal proportional to the second time difference, and wherein said second time difference measuring means comprises means for triggering the generation of a pair of ramp functions having identical slope simultaneously with the generation of said second sonic signal;

means for interrupting one of said pair of ramp functions in response to reception of said second sonic signal at said first point and interrupting the other of said pair of ramp functions in response to reception of said second sonic signal at said second point;

means for comparing the value of said first and second ramp functions after interruption of each; and means for producing a second time difference signal proportional to the difference in the compared values of said first and second ramp functions.

19. A system for detecting the commencement for blowouts and lost circulation in a borehole in which a drilling fluid is being circulated, including a sub having a coupling on each end for incorporation into the drill pipe string of a borehole drilling rig, said sub including an upper end, a lower end, a generally cylindrical outer surface, and a central axial passageway for conducting the flow of drilling into the borehole, said system comprising:

an inner sonic transducer positioned at a central location within the sub within the central passageway for transmitting a sonic signal through the downwardly flowing drilling fluid toward both the upper and lower ends of the sub;

a pair of inner sonic receivers for detecting the sonic signal transmitted from said inner transducer, one of said receivers being located within the central passageway near the upper end of the sub a selected distance from the inner transmitter and the other receiver being located within the central passageway near the lower end of the sub said selected distance from the inner transmitter;

an outer sonic transducing means positioned at said central location of the sub on the cylindrical outer surface for transmitting a sonic signal through the upwardly flowing drilling fluid toward both the upper and lower ends of the sub;

a pair of outer sonic receiving means for detecting the sonic signal transmitted by said outer transducing means, one of said receiving means being located on the outer surface of the sub near the upper end said selected distance from the outer transmitter and the other receiving means also being located on the outer surface of the sub near the lower end of the sub said selected distance from the outer transmitter;

means for measuring a first time difference between reception of the inner sonic signal by the lower inside receiver and by the upper inside receiver;

means for producing an input fluid flow rate signal proportional to said first time difference;

means for measuring a second time difference between reception of the outer sonic signal by the lower outer receiving means and by the upper outer receiving means;

means for producing an output fluid flow rate signal proportional to said second time difference;

means for accumulating input flow rate signals and output flow rate signals; and means for comparing said accumulation of input flow rate signals and said accumulation of output flow rate signals to determine the differences in value therebetween, a preselected difference between the compared values being indicative of the commencement of one of a blowout and lost circulation.

20. A system for detecting the commencement of blowouts and lost circulation in a borehole in which a drilling fluid is being circulated as set forth in claim 19 wherein;

said outer sonic transmitting means comprises a plurality of sonic transmitters equally circumferentially spaced from one another around the cylindrical outer surface of the sub;

said pair of outer sonic receiving means comprises a plurality of pairs of sonic receivers, the receivers of said pairs at each end of the sub being equally circumferentially spaced from one another around the cylindrical outer surface of the sub and each receiver being in axial alignment with an associated transmitter and an associated receiver at the other end of the sub; and said second time difference measuring means includes means for averaging the time differences between reception of the outer sonic signals by each of the plurality of pairs of sonic receivers to produce said second time difference.

21. A system for detecting the commencement of blowouts and lost circulation in a borehole in which a drilling fluid is being circulated as set forth in claim 19 which also includes;

means for shifting the phase of said accumulation of output flow rate signals; and means responsive to coincidence of phase between the accumulations of input and output flow rate signals for actuating said comparing means.

22. A system for detecting the commencement of blowouts and lost circulation in a borehole in which a drilling fluid is being circulated as set forth in claim 19 wherein said first time difference measuring means includes:

a ramp generator being actuated simultaneously with the transmission of the inner sonic signal; and means for accumulating the value of said generator upon reception of the inner sonic signal by one of said inner sonic receivers and accumulating the value of said generator upon reception of the inner sonic signal by the other of said inner sonic receivers, said first time difference being proportional to the difference in accumulated values.

23. A system for detecting the commencement of blowouts and lost circulation in a borehole in which a drilling fluid is being circulated as set forth in claim 19 wherein said first time difference measuring means includes:

a pair of ramp generators having identical slope, both of said generators being actuated simultaneously with the transmission of the inner sonic signal; and means for interrupting the operation of one of said generators upon reception of the inner sonic signal by one of said inner sonic receivers and interrupting the operation of the others of said generators upon reception of the inner sonic signal by the other of said inner sonic receivers, said first time difference being proportional to the difference in signal values in each of the two ramp generators after interruption.

* * * * *